(12) United States Patent
Elstorpff et al.

(10) Patent No.: US 11,485,340 B2
(45) Date of Patent: Nov. 1, 2022

(54) BRAKE CYLINDER COMPRISING A LOCKING DEVICE FOR MECHANICAL BRAKE FORCE LOCKING

(71) Applicant: KNORR-BREMSE SYSTEME FÜR SCHIENENFAHRZEUGE GMBH, Munich (DE)

(72) Inventors: Marc-Gregory Elstorpff, Munich (DE); Ferdinand Hecht, Weichs (DE); Tomasz Niepala, Neufahrn (DE); Jury Meshenberg, Karlsfeld (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 0 days.

(21) Appl. No.: 17/276,433

(22) PCT Filed: Sep. 2, 2019

(86) PCT No.: PCT/EP2019/073371
§ 371 (c)(1),
(2) Date: Mar. 15, 2021

(87) PCT Pub. No.: WO2020/053022
PCT Pub. Date: Mar. 19, 2020

(65) Prior Publication Data
US 2022/0055597 A1    Feb. 24, 2022

(30) Foreign Application Priority Data

Sep. 14, 2018   (DE) .................... 10 2018 122 519.9

(51) Int. Cl.
*B60T 17/16* (2006.01)
*B60T 13/36* (2006.01)
(Continued)

(52) U.S. Cl.
CPC ............ *B60T 17/16* (2013.01); *B60T 13/365* (2013.01); *B60T 13/38* (2013.01);
(Continued)

(58) Field of Classification Search
CPC ........ B60T 13/38; B60T 13/365; B60T 17/16; F16D 2121/06; F16D 2127/04; F16D 2127/06
(Continued)

(56) References Cited

U.S. PATENT DOCUMENTS 2,456,838 A    12/1948  Peterson et al.
6,435,321 B1 *  8/2002  Asano ..................... F16D 65/14
                                                              188/170
(Continued)

FOREIGN PATENT DOCUMENTS

DE    102007015213 B3    12/2008
DE    102007063699 A1     1/2010
(Continued)

OTHER PUBLICATIONS

English machined translation of EP-2826684, description only. Jan. 21, 2015.*
(Continued)

*Primary Examiner* — Robert A. Siconolfi
*Assistant Examiner* — San M Aung
(74) *Attorney, Agent, or Firm* — Barnes & Thornburg LLP (57) ABSTRACT

A brake cylinder includes a locking device for mechanical brake force locking, in particular for rail vehicles, and a service brake piston which can be axially moved inside a housing, which can be moved by applying a pressure medium thereto, and which is coupled to a piston tube, said piston tube being provided with a non-self-locking thread which is engaged with a threaded nut which is rotatably (Continued)

mounted in the housing, and the locking device cooperating with toothing of the threaded nut. The brake cylinder is designed such that the locking device comprises one or more pawl(s), a control piston, an emergency release tappet, and a locking element of the emergency release tappet.

11 Claims, 9 Drawing Sheets

(51) Int. Cl.
  *B60T 13/38* (2006.01)
  *F16D 121/06* (2012.01)
  *F16D 127/04* (2012.01)
  *F16D 127/06* (2012.01)
(52) U.S. Cl.
  CPC ...... *F16D 2121/06* (2013.01); *F16D 2127/04* (2013.01); *F16D 2127/06* (2013.01)
(58) Field of Classification Search
  USPC ........................................................ 188/107
  See application file for complete search history.

(56) References Cited

U.S. PATENT DOCUMENTS

| | | | |
|---|---|---|---|
| 2008/0251327 A1* | 10/2008 | Huber | B60T 17/08 188/33 |
| 2010/0051396 A1 | 3/2010 | Iraschko | |
| 2010/0307873 A1 | 12/2010 | Kraus et al. | |
| 2016/0144843 A1 | 5/2016 | Asano | |
| 2018/0222465 A1* | 8/2018 | Call | B60T 15/041 |

FOREIGN PATENT DOCUMENTS

| | | | | |
|---|---|---|---|---|
| DE | 102011119998 A1 * | 6/2013 | | B60T 17/086 |
| EP | 2826684 A1 | 1/2015 | | |
| WO | 2014042031 A1 | 3/2014 | | |

OTHER PUBLICATIONS

International Search Report corresponding to PCT/EP2019/073371, dated Jan. 7, 2020.

* cited by examiner

BRAKE CYLINDER COMPRISING A LOCKING DEVICE FOR MECHANICAL BRAKE FORCE LOCKING

CROSS REFERENCE AND PRIORITY CLAIM

This patent application is a U.S. National Phase of International Patent Application No. PCT/EP2019/073371 filed Sep. 2, 2019, which claims priority to German Patent Application No. 10 2018 122 519.9, the disclosure of which being incorporated herein by reference in their entireties.

FIELD

Disclosed embodiments relate to a brake cylinder including a locking device for mechanical brake force locking.

BACKGROUND

To prevent parked rail vehicles from rolling away in all circumstances, the immobilization brake has to ensure a correspondingly high brake force even without an external energy supply.

If such a parked rail vehicle has to be towed away, often a compressed air supply, by which a blocking may be released, is not available to this vehicle. In this case, the immobilization brake has to be provided with a corresponding mechanical release device (emergency release device or auxiliary release device) by which the immobilization brake may be released by hand, i.e., without using external energy. The mechanical release device is also used to release the caliper safely when changing the brake pads. Changing the brake pads when the spring accumulator is pneumatically released is unreliable since an inadvertent application of the brake represents too great a safety risk for the service personnel due to the drop in pressure.

SUMMARY

Disclosed embodiments provide an improved brake cylinder comprising an improved locking device for mechanical brake force locking, wherein the control member and the emergency release member are functionally separate and also that the emergency release lock is arranged outside the flux of force. In order to lock the emergency release state, a so-called locking pin is used as a locking element. This locking element locks the emergency release member until the locking element is actuated by the control member and the emergency release state is reset thereby.

BRIEF DESCRIPTION OF THE FIGURES

Exemplary embodiments are described hereinafter with reference to the accompanying drawings, in which.

DETAILED DESCRIPTION

The document EP 2826684 B1 discloses a brake cylinder for rail vehicles in which the immobilization brake is implemented by blocking the service brake. In this case, the blocking device is arranged inside the service brake pressure chamber. In such a brake cylinder, a manual emergency release device is required for mechanical brake force locking, in the depressurized state the manual emergency release device interrupting the flux of force in the blocking mechanism and as a result releasing the parking brake. That reference disclosed an emergency release device that acts directly on the control piston. It is considered a drawback that this emergency release state is not permanently locked, whereby it is not ensured that the release procedure is completed before the blocking mechanism acts once again.

That reference further disclosed an emergency release state that is permanently locked and is held until a control piston resets the blocking mechanism. In that alternative, the emergency release pin is located in the flux of force of the piston force. However, in that case, it is considered a drawback that a high emergency release force is required as a result of the friction on the emergency release pin.

Accordingly, as explained above, disclosed embodiments are directed at providing an improved brake cylinder comprising an improved locking device for mechanical brake force locking, wherein the control member and the emergency release member are functionally separate and also that the emergency release lock is arranged outside the flux of force. In order to lock the emergency release state, a so-called locking pin is used as a locking element. This locking element locks the emergency release member until the locking element is actuated by the control member and the emergency release state is reset thereby.

A brake cylinder according to disclosed embodiments comprises a locking device for mechanical brake force locking, in particular for rail vehicles, and a service brake piston which can be axially moved inside a housing and which can be moved by apply a pressure medium thereto, and which is coupled to a piston tube, wherein the piston tube is provided with a non-self-locking thread which is engaged with a threaded nut which is rotatably mounted in the housing, wherein the locking device cooperates with a toothing of the threaded nut, is configured such that the locking device comprises one or more pawls, a control piston, an emergency release tappet and a locking element of the emergency release tappet.

In this manner, when used in a brake of rail vehicles, the brake cylinder advantageously fulfils the following criteria:
  securing the vehicle against inadvertently rolling away
  permanently ensuring the required immobilizing force
  train-wide activation/deactivation of the various driver's cabs of the vehicle
  manual deactivation (emergency release) of the parking brake in the case of loss of the regular actuating energy.

These criteria are advantageously fulfilled by the brake cylinder according to the disclosed embodiments, by the existing service brake being engaged and mechanically blocked. The blocking mechanism in this case is switched by the so-called control pressure. In this type of immobilization brake, the manual deactivation of the parking brake (emergency release state) is permanently held in order to ensure that the emergency release procedure has been fully executed before the blocking mechanism intervenes once again. The emergency release state is released only by the renewed application of control pressure.

This results in the particular advantages that the emergency release device may be permanently locked, whereby it is ensured that the emergency release procedure may be fully executed. Additionally, the emergency release actuation is not located in the flux of force of the parking brake, resulting in smaller emergency release forces and, thus, less wear.

In one embodiment, the control piston and the emergency release tappet are arranged parallel to one another and closely adjacent to one another, wherein a control axis of the control piston and an emergency release axis of the emergency release tappet run parallel to one another and at right angles to a piston axis of the brake cylinder. This is advantageous since, on the one hand, these control elements are not located in the flux of force of the service brake piston and, on the other hand, a compact design may be achieved.

It is advantageous if a longitudinal axis of the locking element as an arresting element axis runs at right angles to the control axis of the control piston and the emergency release axis of the emergency release tappet and intersects the control axis of the control piston and the emergency release axis of the emergency release tappet, since in this manner a space requirement remains small.

In a further embodiment, the locking element is displaceably guided in the direction of its locking element axis in a locking block of the emergency release tappet and a receiver of a holding portion of a housing of the brake cylinder and is pretensioned by a spring in the direction of the control piston. Thus, the number of components may be advantageously reduced.

In a still further embodiment, a control surface of a conical control body of the control piston is in contact with a control portion of the locking element. A particular advantage here is in the compact design and the multifunctionality of the control piston.

In this case, it is particularly advantageous if the locking element is adjustable, by the contact of its control portion with the control surface of the conical control body of the control piston in the direction of its locking element axis as a function of the position of the control piston, from a first position in which the locking element axially locks the emergency release tappet into a second position in which the locking element axially unlocks the emergency release tappet, and back again. Thus, a plurality of functions may be implemented with a very small space requirement.

In a still further embodiment, the locking element has an arresting portion which in the first position of the locking element is engaged with a step of a locking block of the emergency release tappet in a locked state of the emergency release tappet and axially locks the emergency release tappet. This is advantageous since in this manner the emergency release tappet may implement a plurality of functions.

In a disclsoed embodiment, the one or more pawl(s) are arranged radially opposing one another on the toothing of the threaded nut relative to a piston axis to which the threaded nut is coaxially arranged. This results in an advantageously small constructional space.

It is further provided that the one or more pawl(s) are able to be actuated at the same time both by the control piston and by the emergency release tappet. This reduces the number of components and saves installation space.

A further embodiment provides that the locking device is adjustable by the control piston and/or the emergency release tappet, from a blocking state in which by an engagement with the toothing of the threaded nut the one or more pawls block the rotation thereof about the piston axis, into a release state in which the pawls are disengaged from the toothing of the threaded nut and do not block the threaded nut in terms of its rotation, wherein the locking device is adjustable from the release state into the blocking state by means of the control piston if, after the application of pressure, the control piston is subsequently vented again. Thus, an advantageous control and actuation is possible even in the case of an emergency release.

It is additionally provided that the one or more pawl(s) of the locking device are movable independently of one another. The advantage here is that the pawls may be brought into engagement with the toothing of the threaded nut independently of one another.

In a further embodiment, a pressure medium is able to be applied to the control piston and the emergency release tappet is adjustable manually and/or by the use of a tool. Naturally the control piston may also be actuated by a further actuator, for example by an electric motor or hydraulically. This results in an advantageously simple actuation.

Figure 1:
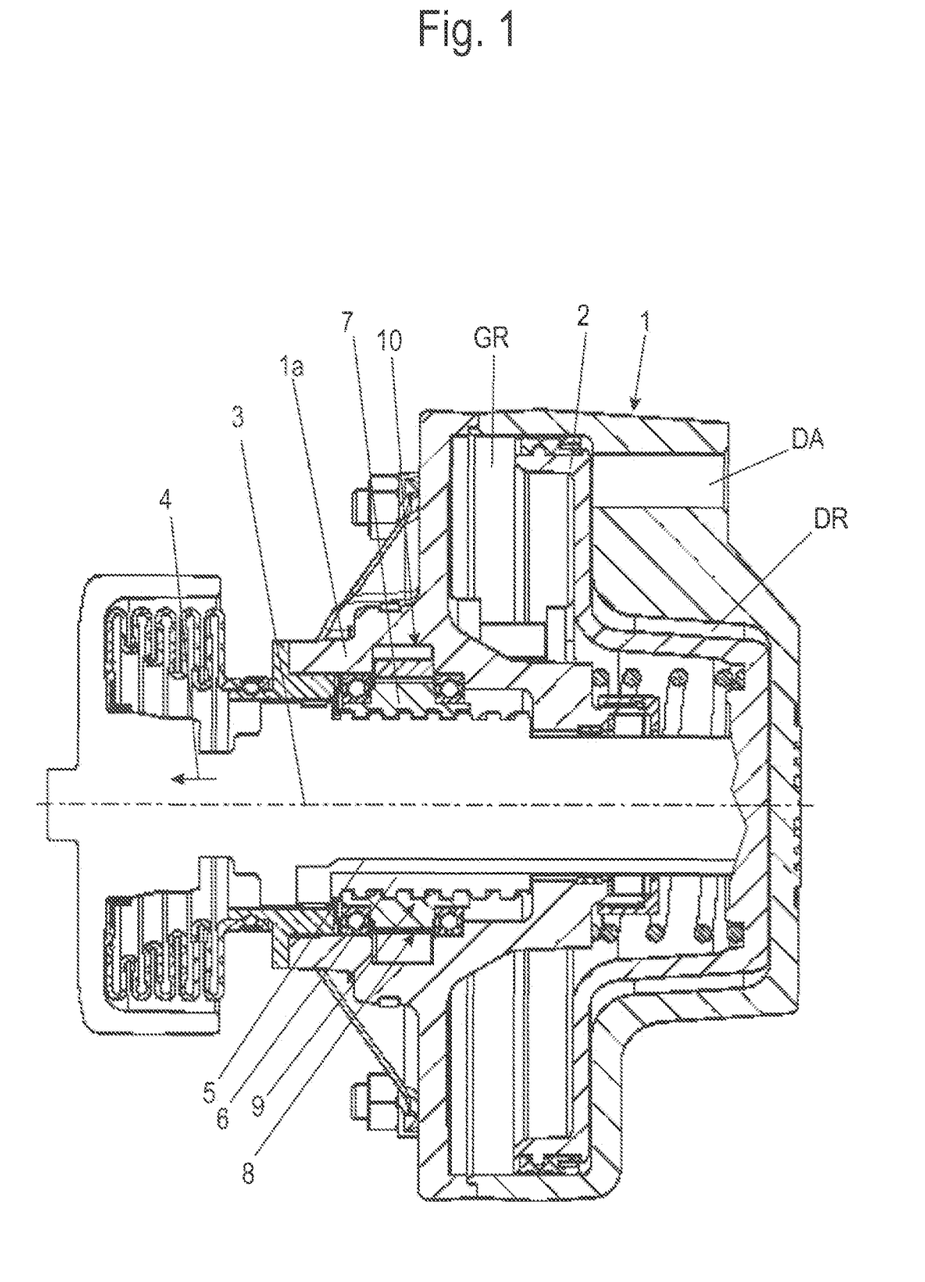
FIGS. 1-2 show schematic longitudinal sections of an exemplary embodiment of a brake cylinder with a locking device.
Figure 2:
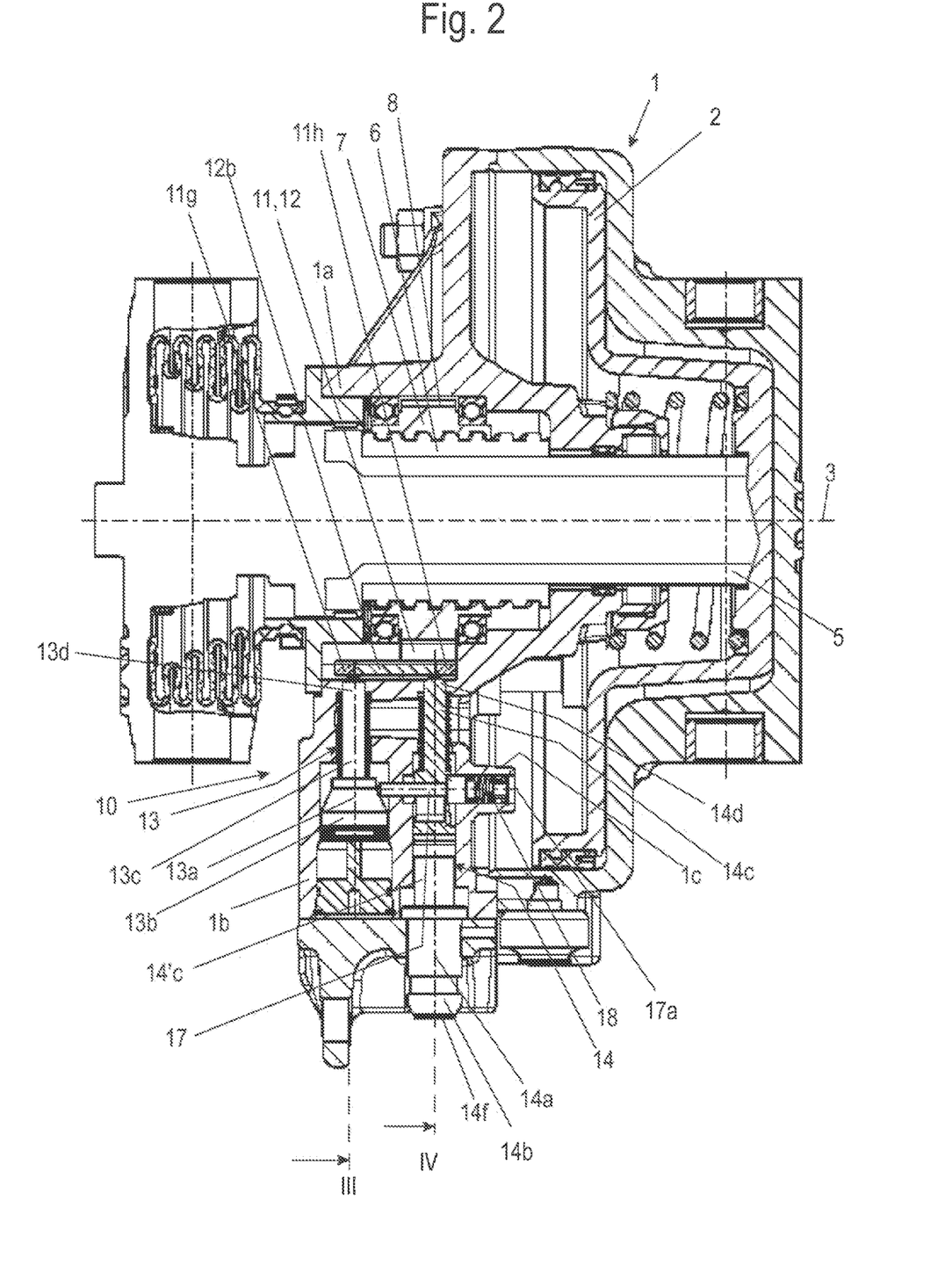
Figure 2A:
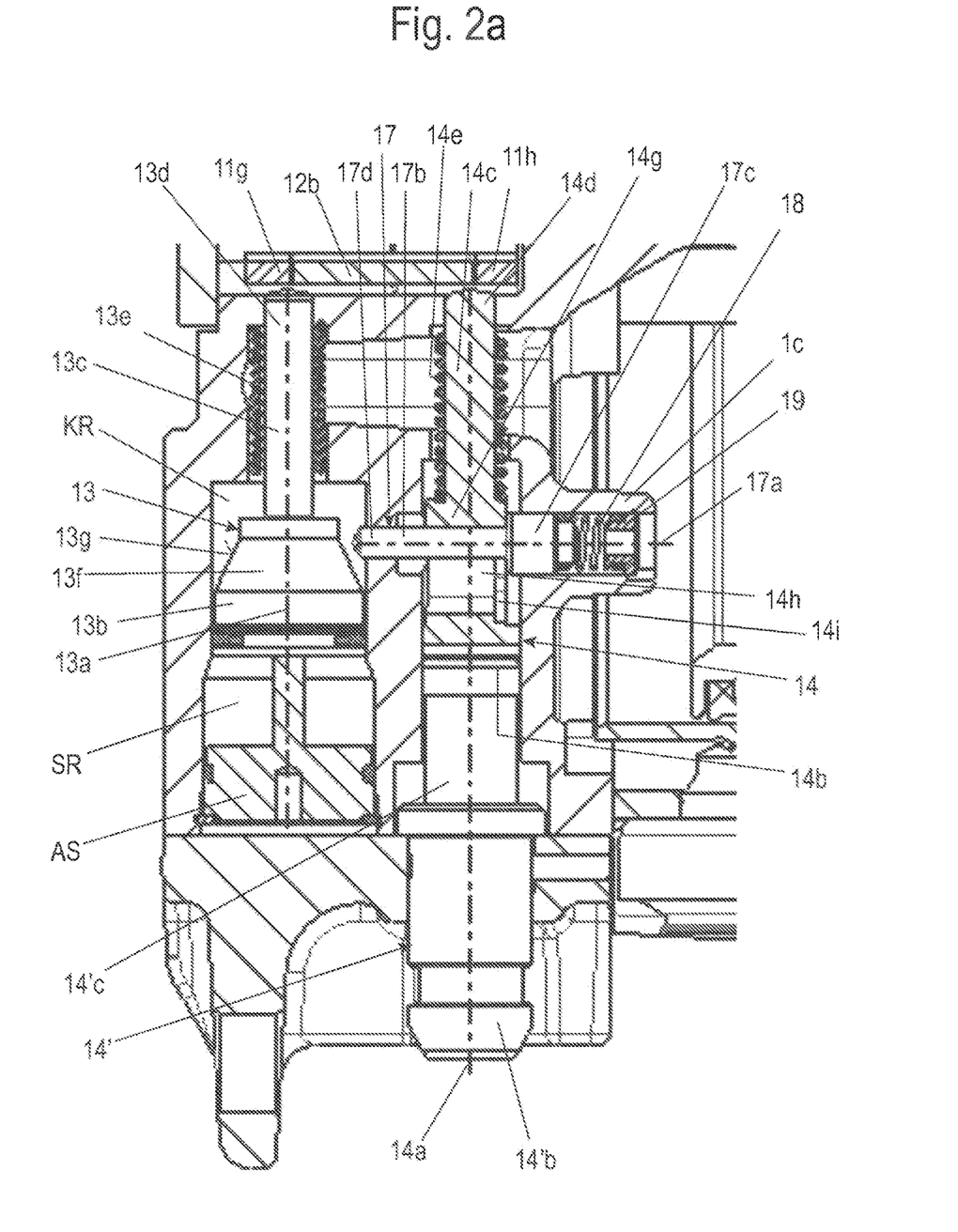
FIGS. 2a-2c show enlarged sectional views of an arrangement of a control piston and a emergency release tappet of the locking device of the exemplary embodiment according to FIG. 2 in various positions.
Figure 2B:
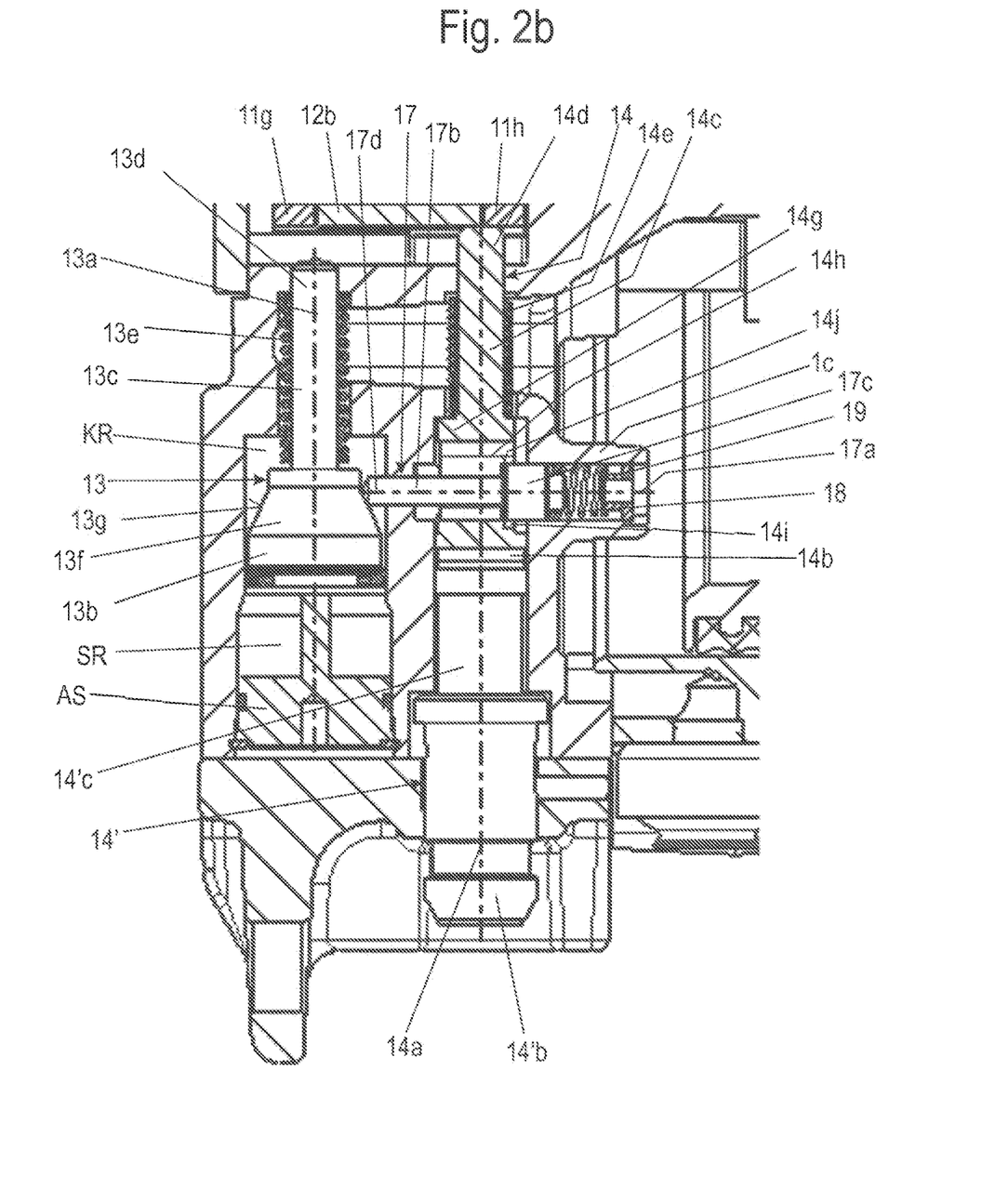
Figure 2C:
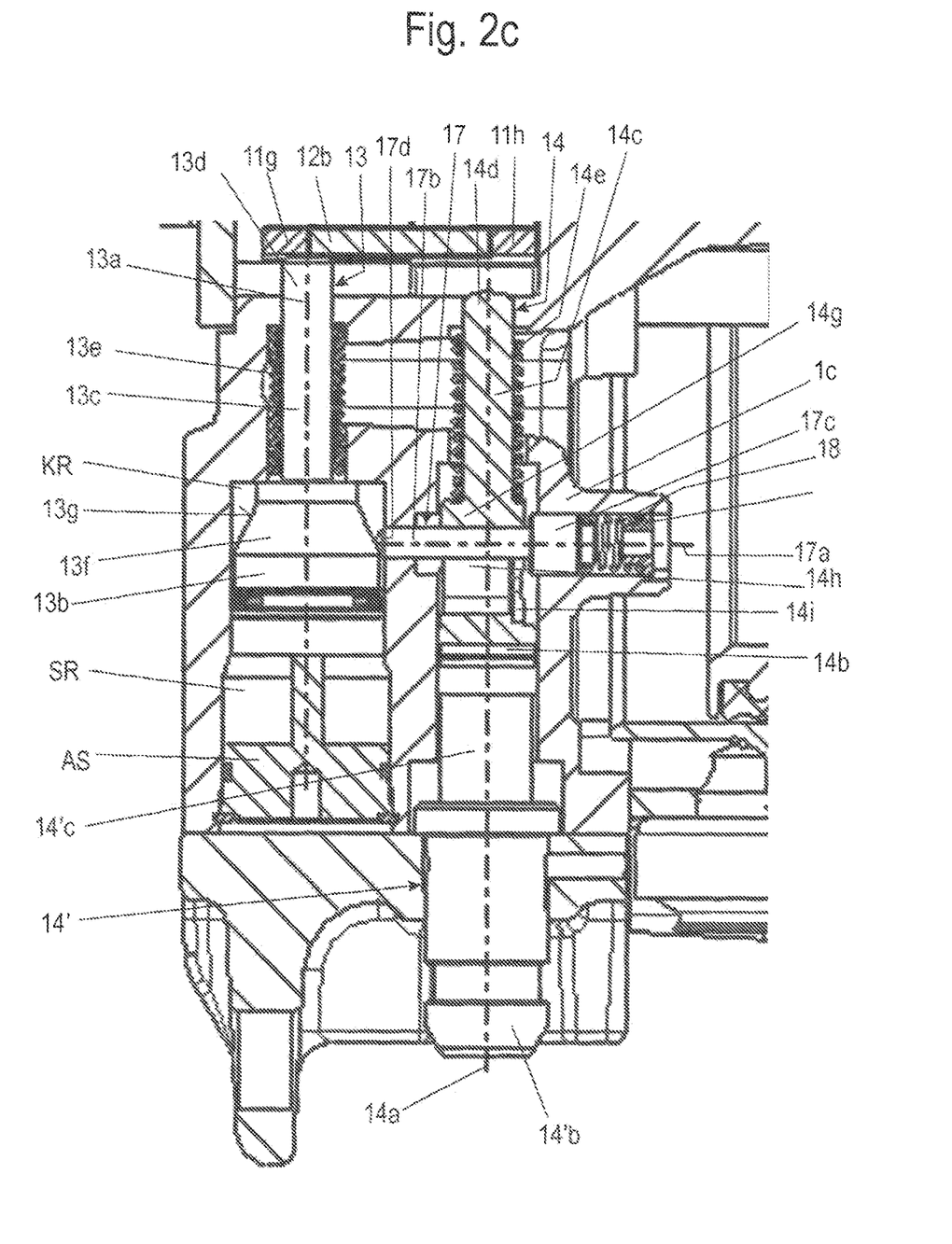

FIG. 1 shows a schematic longitudinal section of a first exemplary embodiment of a brake cylinder 1 according to the disclosed embodiments comprising a locking device 10. The view in FIG. 2 shows the brake cylinder 1 according to FIG. 1 rotated by 90° about a piston axis 3 in a longitudinal section. FIG. 2a shows an enlarged sectional view of an arrangement of a control piston 13 and an emergency release tappet 14 of the locking device 10 of the exemplary embodiment according to FIG. 2 in a resting position. In FIG. 2b the arrangement of the control piston 13 and the emergency release tappet 14 is shown in a release position of the emergency release tappet 14. FIG. 2c shows a release position of the control piston.

The brake cylinder 1 comprises the locking device 10 as mechanical brake force locking and is provided for use in rail vehicles.

The generally known construction and function of the brake cylinder 1 are not described here in more detail.

A housing interior GR is arranged in a housing 1a of the brake cylinder 1, a service brake piston 2 being displaceably arranged in the housing interior along a piston axis 3 in a direction of movement 4.

The service brake piston 2 separates a pressure chamber DR from the housing interior GR of the housing 1a. The pressure chamber DR is connected to a pressure connection DA, a pressure medium, for example compressed air, being able to be applied thereby to the pressure chamber DR, and thus, to the service brake piston 2.

The service brake piston 2 is connected to one end of a piston tube 5, which extends through the housing 1a along the piston axis 3 and which is connected to a piston rod, not shown. In the case of a braking procedure, this piston rod transmits a brake force to a brake linkage of a rail vehicle (not shown here).

The other end of the piston tube 5 has a threaded portion 6 with an external thread which is fixedly connected to the piston tube 5. The thread 9 of the threaded portion 6 attached to the piston tube 5 is engaged with an internal thread of a threaded nut 7 mounted in the housing 1a. The thread 9 is designed to be non-self-locking. The threaded nut 7 is rotatably mounted about the piston axis 3 and axially fixed in the associated portion of the housing 1a.

If pressure is applied to the pressure chamber DR of the brake cylinder 1 and, thus, the service brake piston 2 via the pressure connection DA, the service brake piston 2 moves together with the piston tube 5 to the left in the direction of movement 4 (in this case in FIG. 1).

This axial movement of the service brake piston 2 and the piston tube 5 in the direction of the piston axis 3 effects a rotation of the threaded nut 7 about the piston axis 3, due to the non-self-locking threaded engagement of the threaded portion 6 and the threaded nut 7. If the rotation of the threaded nut 7 is hindered by a blocking procedure, the axial movement of the service brake piston 2 is arrested at the same time. Such a blocking procedure is implemented in this case by the locking device 10 which cooperates with an external toothing 8 of the threaded nut 7.

The locking device 10 is described hereinafter in connection with FIGS. 2, 2a, 2b, 2c, 3 and 4.

Figure 3:
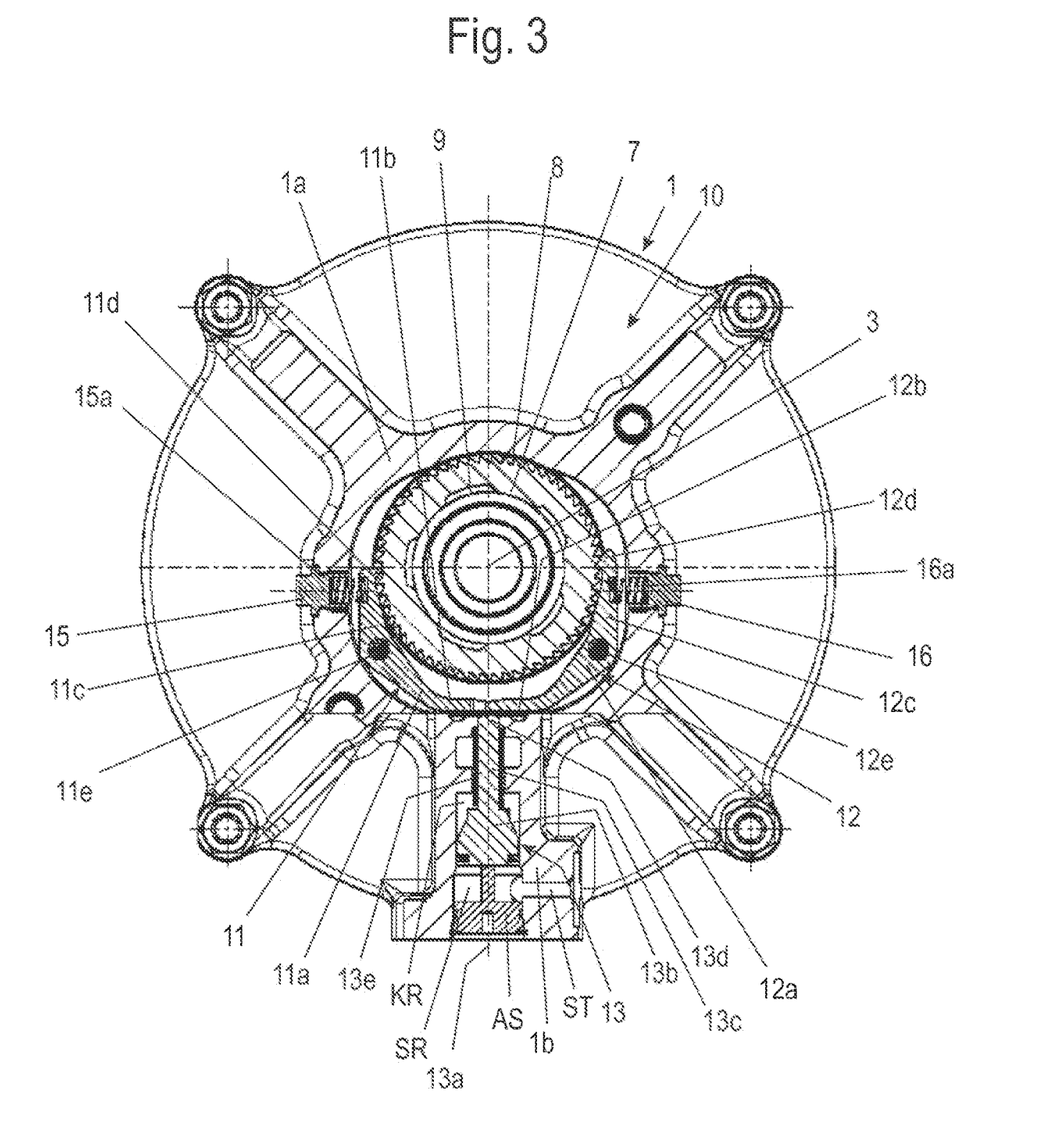
FIG. 3 shows a schematic radial section along a cutting line III of the brake cylinder according to FIG. 2.
Figure 4:
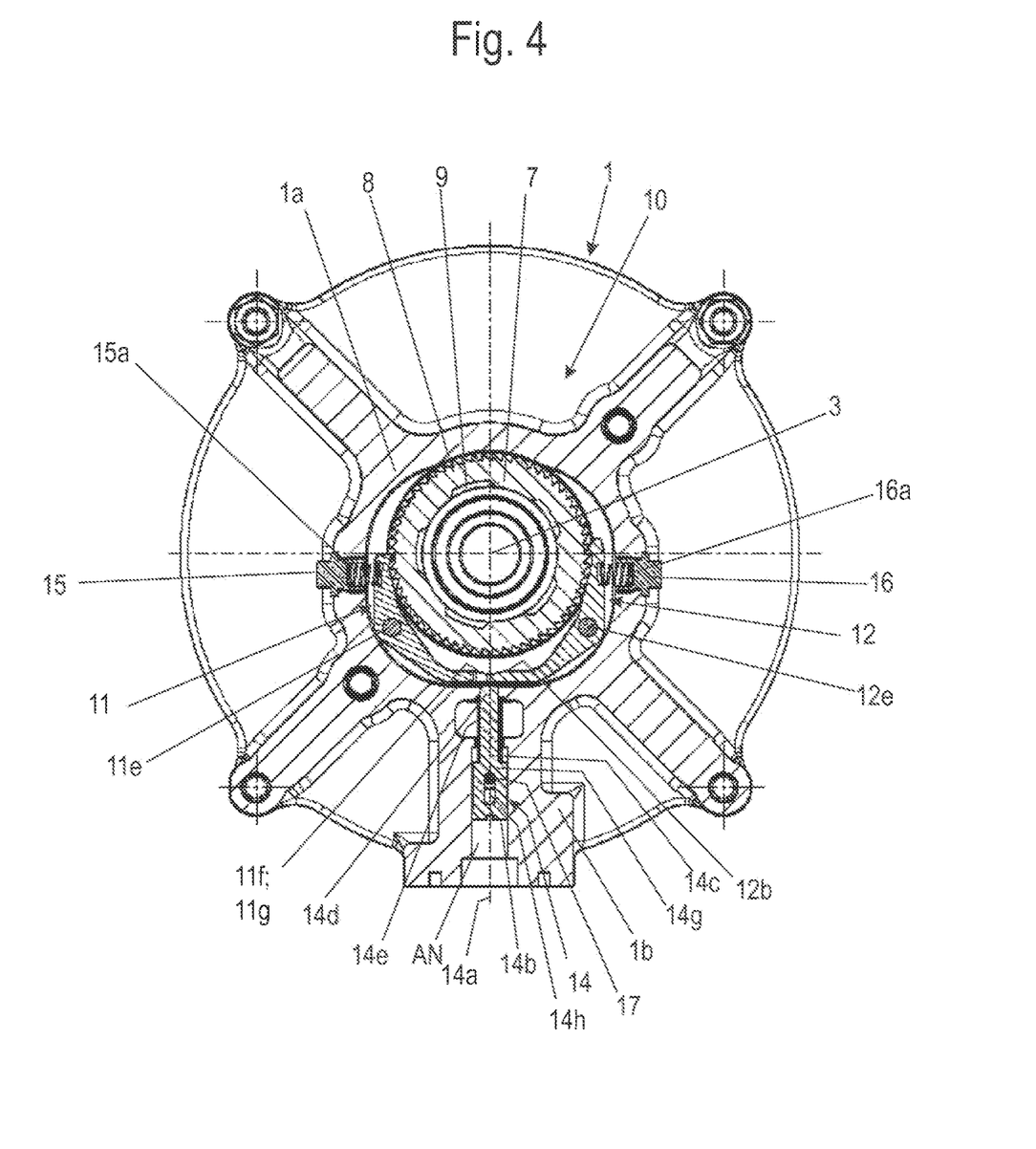
FIG. 4 shows a schematic radial section along a cutting line IV of the brake cylinder according to FIG. 2.

FIG. 3 shows a schematic radial section along a cutting line III of the brake cylinder 1 according to FIG. 2 and in FIG. 4 a schematic radial section is shown along a cutting line IV of the brake cylinder 1 according to FIG. 2.

In this first exemplary embodiment, the locking device 10 comprises the threaded portion 6 of the piston tube 5, the threaded nut 7, a first pawl 11, a second pawl 12, a control piston 13, an emergency release tappet 14 and a locking element 17.

The pawls 11, 12 in this case form blocking elements which are radially opposingly arranged relative to the piston axis 3 to which the threaded nut 7 is coaxially arranged, the pawls cooperate with the toothing 8 of the threaded nut 7 and are actuated by the control piston 13 and the emergency release tappet 14. In this case both the control piston 13 and the emergency release tappet 14 actuate both pawls 11, 12 at the same time.

By means of the control piston 13 the locking device 10 may be adjusted from a blocking state into a release state and back again (and/or vice versa). By means of the emergency release tappet 14 the locking device 10 may be moved only from the blocking state into the release state, but this is not possible in reverse. After the locking device 10 has been adjusted by means of the emergency release tappet 14 into the release state, the locking device 10 may no longer be adjusted into the blocking state by the emergency release tappet 14. Only the control piston 13 is able to adjust the locking device 10 again into the blocking state by the application of pressure and subsequent venting.

In the blocking state, by an engagement with the toothing 8 of the threaded nut 7, the pawls 11, 12 block the rotation thereof about the piston axis 3 whilst in the release state the pawls 11, 12 are disengaged from the toothing 8 of the threaded nut 7 and this threaded nut is not blocked in terms of rotation. The blocking state of the locking device 10 is shown in FIGS. 3 and 4, wherein FIG. 3 shows the actuation via the control piston 13.

The actuation via the emergency release tappet 14 is shown in FIGS. 2b and 4.

If the emergency release tappet 14 is actuated, the locking element 17 as an arresting device locks the emergency release tappet 14 in the release position. If control pressure is applied to the control piston 13, the control piston 13 moves (upwardly in FIGS. 2, 2c, 3, 5, 6) in the direction of the piston axis 3, and the locking element 17 is displaced via a conical control body 13f with a control surface 13g of the control piston 13 for unlocking the emergency release tappet 14. As a result, the emergency release tappet is moved by the spring 14e into its resting position. The release state, which is released in an emergency, is, thus, replaced by a pneumatic release state, by the control piston 13 bringing the pawls 11, 12 out of engagement with the toothing 8. This is described in further detail below and also in connection with FIG. 6.

The pawls 11, 12 are configured as angle levers with two respective lever arms 11a, 11c; 12a, 12c and in each case are pivotably arranged about a pivot axis 11e, 12e in the housing 1a. In this case the pawls 11, 12 encompass the toothing 8 of the threaded nut 7 by approximately more than 180° (FIGS. 3-4). The pivot axes 11e, 12e run parallel to one another and parallel to the piston axis 3.

The pawls 11, 12 in each case comprise a first lever arm 11a, 12a with a drive end 11b, 12b and a second lever arm 11c, 12c with a pawl end 11d, 12d. In each case the pawl ends 11d, 12d cooperate opposingly with the teeth of the toothing 8 of the threaded nut 7 such that in the blocking state of the locking device 10 the pawl ends form a positive connection with the associated teeth, as in the case of a locking mechanism, for example. In this case the threaded nut 7 with its toothing 8 is a toothed ratchet wheel and the pawl ends 11d, 12d of the pawls 11, 12 are the respective pawls of such a locking mechanism.

In this case the toothing 8 is configured such that each tooth has a radial flank and an inclined flank relative to the piston axis 3. In the blocking state of the locking device 10 the respective radial flanks are in contact with the radial flanks of the pawl ends 11d, 12d.

In this case one pawl end 11d is designed to be pushing and the other pawl end 12d is designed to be pulling. This may be identified in FIGS. 3-4. In other words, if a rotation of the threaded nut 7 counterclockwise about the piston axis 3 is blocked in the blocking state of the locking device 10, a radial flank of the toothing 8 is in contact with a radial flank of the pawl end 12d such that a pulling force is transmitted to the second lever arm 12c of the second pawl 12. This pulling force is introduced into the housing via the bearing of the pivot axis 12e of the second pawl 12 in the housing 1a. Thus, the pawl end 12d of the second pawl 12 acts as a pulling pawl end 12d.

On the radially opposing side of the threaded nut 7, a radial flank of the toothing 8 is also in contact with a radial flank of the pawl end 11d, wherein however a pushing force is transmitted from the toothing 8 to the pawl end 11d and the second lever arm 11c of the first pawl 11. As in the case of the second pawl 12, this pushing force is introduced into the housing via the bearing of the pivot axis 11e of the first pawl 11 in the housing 1a. The pawl end 11d of the first pawl 11 acts in this manner as a pushing pawl end 11d.

The pawl ends 11d, 12d are arranged offset to one another by half a tooth pitch relative to the toothing 8 of the threaded nut 7 and are able to fall independently of one another into the toothing 8, i.e., come into engagement therewith and correspondingly out of engagement.

The arresting elements in the form of the pawl ends 11d, 12d in each case are arranged offset to one another by a 1/n tooth pitch of the toothing 8, wherein n is the number of arresting elements. As a result, the toothed wheel, i.e., the toothing 8 with the threaded nut 7, may rotate back by a maximum of 1/n tooth pitch, whereby the loss of force is reduced by a factor of 1/n. Additionally, the number of load cycles of the individual teeth of the toothing 8 and/or the arresting elements, i.e., pawl ends 11d, 12d, is reduced, whereby the components may be of more compact design.

In the blocking state of the locking device 10, the pawls 11, 12 are respectively pushed by means of a spring 15a, 16a into engagement with the toothing 8 of the threaded nut 7. The springs 15a, 16a in each case are compression springs and held in a spring holder 15, 16 in the housing 1a, and in each case are in contact with the pawl end 11d, 12d of the pawls 11, 12. In this case, the spring force of the spring 15a acts on the second lever arm 11c of the first pawl 11, such that the first pawl 11 is pivoted clockwise about its pivot axis 11e (FIGS. 3-4) and the pawl end 11d comes into engagement with the toothing 8 of the threaded nut. Similarly, the spring force of the spring 16a acts on the second lever arm 12c of the second pawl 12 such that the second pawl 12 is pivoted counterclockwise about its pivot axis 12e (FIGS. 3-4) and the pawl end 12d also comes into engagement with the toothing 8 of the threaded nut.

In this manner, the blocking state is automatically adopted when the pawls 11, 12 are not actuated by the control piston 13 or/and the emergency release tappet 14.

The control piston 13 and the emergency release tappet 14 are adjustably and/or displaceably arranged in a housing portion 1b and cooperate with the pawls 11, 12. Additionally, the control piston 13 and the emergency release tappet 14 cooperate with a locking element 17 of an arresting device. The control piston 13 and the emergency release tappet 14 are additionally arranged parallel to one another and closely adjacent to one another, i.e., a control axis 13a of the control piston 13 and an emergency release axis 14a of the emergency release tappet 14 run parallel to one another.

The control piston 13 comprises the control axis 13a in its longitudinal direction, a drive portion 13b, a cylindrical body 13c, an output end 13d, a spring 13e and a conical control body 13f with a control surface 13g. The drive portion 13b is configured as a cylindrical piston and is arranged and guided in a piston chamber KR in the housing portion 1b. The piston chamber KR opens into the control pressure chamber SR which communicates with a control pressure connection ST and is closed by a stop element AS. A free front face of the drive portion 13b faces into the control pressure chamber SR.

The drive portion 13b at its other end transitions into the large diameter of the conical control body 13f, which tapers in the direction of the piston axis 3a. The tapered end of the conical control body 13f having the small diameter is connected to the cylindrical body 13c, the free end thereof forming the output end 13d. The body 13c is additionally guided in the housing 1b. The spring 13e is a compression spring and surrounds the body 13c. By means of a pressure medium, for example compressed air, which is applied to the control pressure chamber SR, the control piston 13 is adjustable against the force of the spring 13e, which is supported on the housing 1b, along the control axis 13a from a resting position into a release position. In the resting position, the free surface of the drive portion 13b is in contact with the stop element AS, which fixes the resting position of the control piston 13.

The control surface 13g of the conical control body 13f is in contact with a control portion 17d of the locking element 17, the longitudinal axis thereof running as a locking element axis 17a at right angles to the control axis 13a of the control piston 13 and the emergency release axis 14a of the emergency release tappet 14, and parallel to the piston axis 3, and intersecting the control axis 13a of the control piston 13 and the emergency release axis 14a of the emergency release tappet 14. The locking element 17 is described in more detail below.

In the exemplary embodiment described herein the emergency release tappet 14 is designed in two parts and comprises the emergency release tappet 14 and an emergency release actuator 14'.

The emergency release tappet 14 and the emergency release actuator 14' have a common emergency release axis 14a in the longitudinal direction thereof. The emergency release tappet 14 also comprises an actuating end 14b, a cylindrical body 14c, an output end 14d, a spring 14e and a locking block 14g. The actuating end 14b is guided in a receiver space AN in the housing portion 1b. A free front face of the drive portion 14b faces toward an external opening of the receiver space AN.

The other end of the actuating portion 14b is connected to the locking block 14g. The locking block 14g has a guide portion 14h which cooperates with the locking element 17. The guide portion 14h is a central through-hole which extends in the direction of the emergency release axis 14a and is continuous at right angles thereto in the direction of the locking element axis 17a. On the side remote from the control piston 13, the guide portion 14h is provided with a step 14i which is formed by an indentation. In this case, this indentation is a slot having a width which is greater than the width of the guide portion 14h. The width of this indentation corresponds to a cylindrical arresting portion 17c of the locking element 17. A depth of this indentation in the direction of the control piston 13 corresponds approximately to a quarter of the depth of the guide portion 17h. The step 14i is formed in this manner, the edge thereof facing toward the piston axis 3 forming a stop 14j for the cylindrical locking portion 17c of the locking element 17. This is described in more detail below.

The cylindrical body 14c is attached to the end of the locking block 14g facing the piston axis 3, the free end of the cylindrical body forming the output end 14d. The body 14c is additionally guided in the housing 1b. The spring 14e is a compression spring and surrounds the body 14c. The emergency release tappet 14 is adjustable (for example axially displaceable) by means of a tool via the actuating portion 14f against the force of the spring 14e, which is supported on the housing 1b, along the emergency release axis 14a from a resting position into an emergency release position. A further body 14'c may be attached between the actuating end 14b and the arresting body 14g, as shown for example in FIG. 2a.

In the examples shown in FIGS. 2, 2a, 2b and 2c, the emergency release actuator 14' is not shown in section and comprises a body 14'c and an actuating end 14'b which protrudes from the housing 1b. The other end of the body 14'c is in contact with the actuating end 14b of the emergency release tappet 14. The emergency release actuator 14' is axially displaceably guided in the housing 1, wherein its stroke is axially limited.

The emergency release actuator 14' acts from outside of the housing onto the emergency release tappet 14 when the actuating end 14'b of the emergency release actuator 14' is actuated (pressed) by a suitable tool.

In the remaining figures, only the emergency release tappet 14 is shown, without the emergency release actuator 14'.

Figure 5:
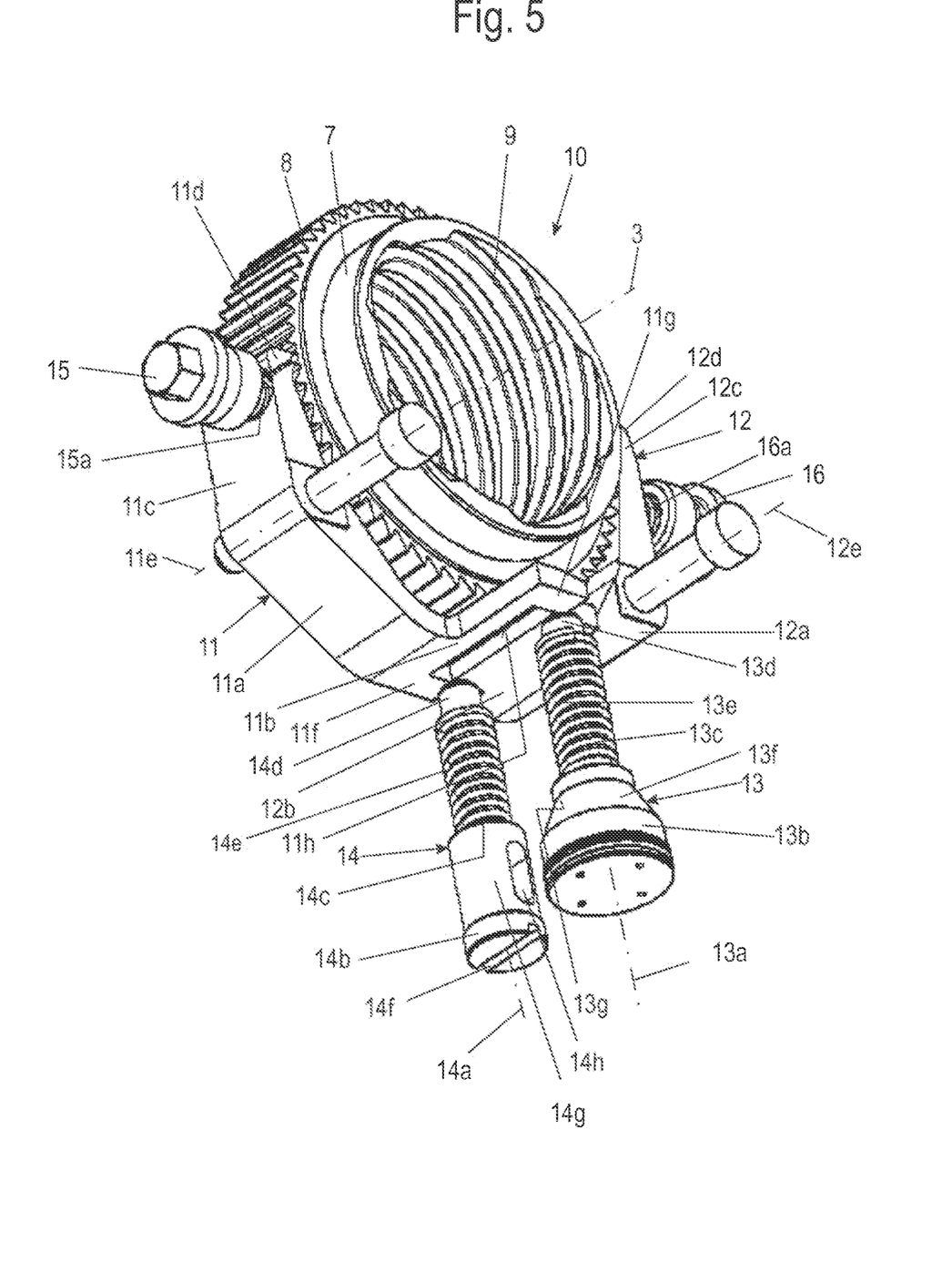
FIG. 5-6 show schematic perspective views of the locking device of the exemplary embodiment according to FIGS. 1-2.
Figure 6:
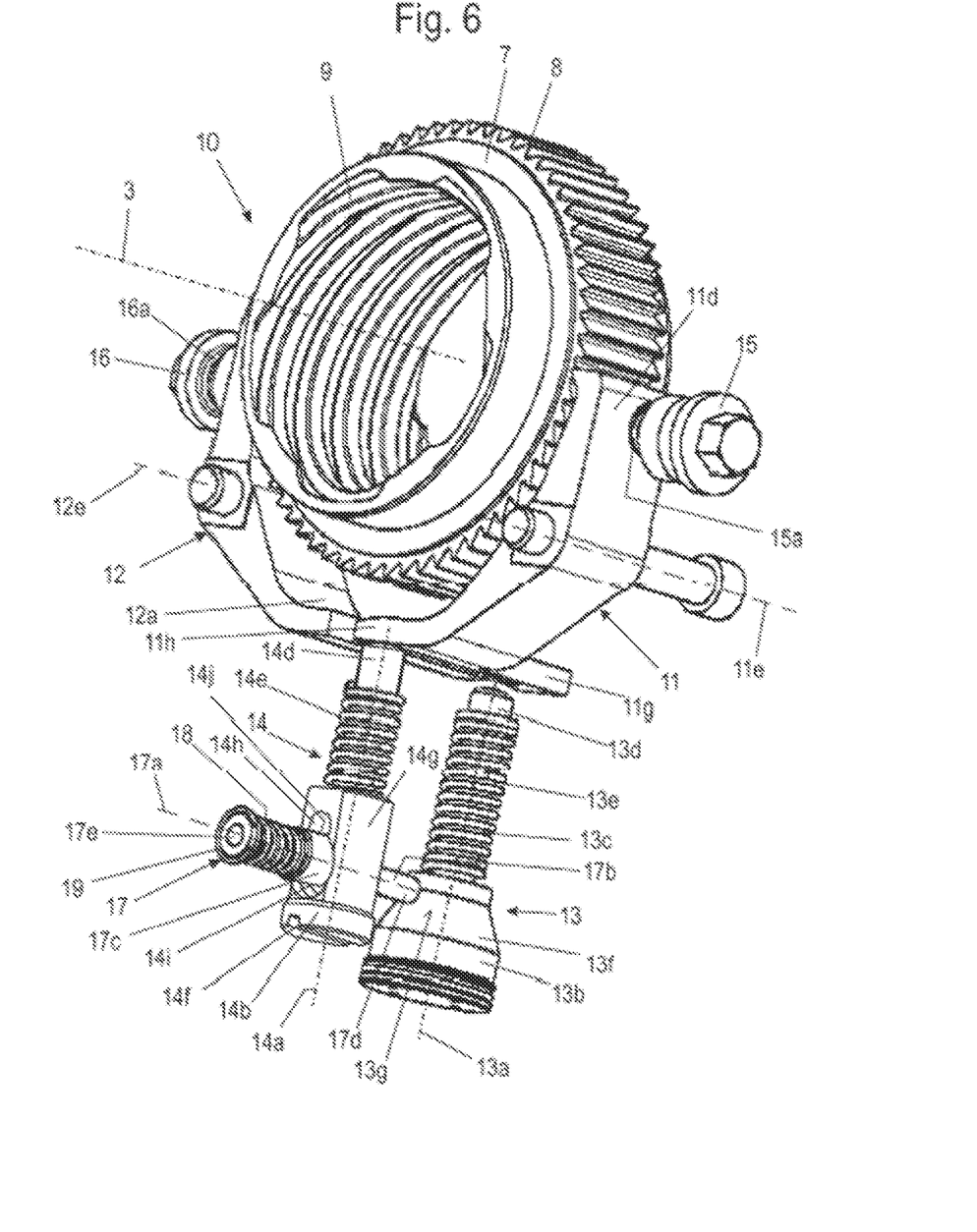

FIG. 5 shows a schematic perspective view of the locking device 10 of the exemplary embodiment according to FIGS. 1-2. FIG. 6 shows the schematic perspective view of the locking device 10 according to FIG. 5 together with the locking element 17 from a further viewing angle.

The locking element 17 comprises the locking element axis 17a, a cylindrical body 17b, the cylindrical arresting portion 17c, the control portion 17d and a spring portion 17e.

The cylindrical body 17b has at its free end the control portion 17d. The other end is connected to one end of the cylindrical arresting portion 17c. A diameter of the cylindrical body 17b corresponds to the width of the guide portion 14h of the arresting body 14g of the emergency release tappet 14. In this case, the diameter of the cylindrical arresting portion 17c of the locking element 17 is approximately double the size of the diameter of the cylindrical body 17b and corresponds to the indentation of the step 14i of the arresting body 14g of the emergency release tappet 14.

The other end of the cylindrical arresting portion 17c is connected to the cylindrical spring portion 17e, which in this case has approximately the diameter of the cylindrical body 17b. The free end of the cylindrical spring portion 17e is provided with a guide 19 for a spring 18, which is arranged around the cylindrical spring portion 17e and which is supported on the other end of the cylindrical arresting portion 17c. The free end of the spring 18 in turn is supported in a holding portion 1c of the housing 1b. The holding portion 1c is provided with a receiver for the spring 18 and the cylindrical arresting portion 17c of the locking element 17, the receiver corresponding to the diameter of the cylindrical arresting portion 17c and displaceably guides this arresting portion (FIGS. 2-2a).

FIG. 2a shows the control piston 13 and the emergency release tappet 14 in the respective resting position thereof. Neither the control piston 13 nor the emergency release tappet 14 are actuated.

The arrested and/or locked state of the emergency release tappet 14, which is its release position, is shown in FIG. 2b. In contrast thereto, the control piston 13 is in its resting position. In this case the locking device 10 is located in the release position, since the emergency release tappet 14 has adjusted the locking device 10 into the release position, and this is maintained due to the release position of the emergency release tappet 14 fixed by the locking element 17.

In FIG. 2c the release position of the control piston 13 is shown. In contrast thereto the emergency release tappet 14 is in its resting position. In this case the locking device 10 is in the release position since the control piston 13 has adjusted the locking device 10 into the release position.

The locking element 17 is in contact by means of its control portion 17d with the smaller diameter of the control surface 13g of the conical control portion 13f of the control piston 13. The cylindrical body 17b of the locking element 17 extends through the guide portion 14h of the arresting body 14g of the emergency release tappet 14, wherein the arresting portion 17c has fallen into the step 14i of the arresting body 14g and is guided in the receiver of the holding portion 1c. The spring 18 pushes the locking element 17 and, thus, the arresting portion 17c into the step 14i of the arresting body 14g. The emergency release tappet 14 is, thus, axially fixed. The release position of the locking device 10 is maintained.

If the control piston 13 is now actuated by control pressure, the control piston 13 moves upwardly in the direction of the piston axis 3. In this case the control portion 17d of the locking element 17 slides on the control surface 13g of the control portion 13f of the control piston 13 from the small diameter to the large diameter and in this manner is displaced in the direction of the emergency release tappet 14. The arresting portion 17c is pushed into the receiver of the holding portion 1c against the spring force of the spring 18 and comes out of engagement with the step 14i of the locking block 14g of the emergency release tappet 14. Now the emergency release tappet 14 is once again freely axially movable, since its locking is released, and is displaced downwardly again by its spring 14e into its resting position. Thus, the emergency release state is reset and an adjustment of the locking device 10 by the control piston 13 is possible once again.

In other words, the locking element 17 is adjustable, by the contact of its control portion 17d with the control surface 13g of the conical control body 13f of the control piston 13 in the direction of its locking element axis 17a as a function of the position of the control piston 13, from a first position in which the locking element 17 axially locks the emergency release tappet 14 into a second position in which the locking element 17 axially unlocks the emergency release tappet 14, and back again.

The control piston 13 and the emergency release tappet 14 are arranged adjacent to one another such that their longitudinal axes, i.e., the control axis 13a and the emergency release axis 14a, run parallel to one another and at right angles to the piston axis 3.

Both the output end 13d of the control piston 13 and the output end 14d of the emergency release tappet 14 cooperate in the release position of the control piston 13 and in the emergency release position of the emergency release tappet 14 in each case with the drive end 11b of the first pawl 11 and the drive end 12b of the second pawl 12. To this end, the drive ends 11b and 12b are configured differently here, which may be clearly identified in FIG. 5.

The drive end 11b of the first pawl 11 is configured to be fork-shaped, with two drive portions 11f as tines and a spacing between the drive portions 11f. Between the drive portions 1 if the drive end 12b of the second pawl 12 is of plate-shaped configuration and is arranged between the drive portions 11f. The drive end 11b with the drive portions 11f of the first pawl 11 and the drive end 12b of the second pawl 12 and, thus, the two pawls 11, 12 are movable independently of one another.

The output end 13d of the control piston 13 and the output end 14d of the emergency release tappet 14 cooperate in each case with a drive portion 11f of the first pawl 11 and with the drive portion 12b of the second pawl 12, wherein in the respective release positions the output ends are in contact in each case with a drive portion 11f of the first pawl 11 and with the drive portion 12b of the second pawl 12 and bring the pawls 11, 12 about the respective pivot axis 11e, 12e out of engagement with the toothing 8 of the threaded nut 7.

If the locking device 10 is in the blocking state, i.e., the pawls 11, 12 are engaged with the toothing 8 of the threaded nut 7, an immobilization brake or parking brake is in operation. The blocking state of the locking device 10 may, thus, be adjusted into the release state by applying control pressure to the control piston 13. In this case the control piston 13 is adjusted from its resting positon into its release position, wherein it actuates the pawls 11, 12 with its output end 13d. Then the brake cylinder 1 is ready for service braking.

If an emergency function is required when, for example, no control pressure is available for the control piston 13 or with the loss of actuating energy, the emergency release tappet 14 may be adjusted by means of a tool (i.e., axially displaced). In this case the emergency release tappet 14 is adjusted from its resting positon into its release position, wherein the emergency release tappet actuates the pawls 11, 12 with its output end 14d.

In order to adopt the blocking state, control pressure is no longer applied to the control piston 13. Then the control piston 13 is adjusted by the spring force of its spring 13e out of its release position into its resting position, wherein the pawls 11, 12 are adjusted again by their springs 15a, 15b into engagement with the toothing 8 of the threaded nut 7. In the case of the emergency release tappet 14, this is reset from its release position into its resting position. The spring 14e of the emergency release tappet 14 in this case acts as assistance and causes the emergency release tappet 14 to be held in its resting position. In this case the pawls 11, 12, as described above, are also brought into engagement with the toothing 8 of the threaded nut 7.

The control piston 13 and the emergency release tappet 14 are functionally separate. The emergency release tappet 14 is arranged outside a flux of force of the service brake piston 2. The locking element 17 of the locking device locks the emergency release tappet 14 until the locking element 17 is actuated by the control piston 13 and the emergency release state is reset.

The emergency release tappet is, thus, permanently locked, whereby it is ensured that the emergency release procedure may be fully executed. The emergency release actuation is not in the flux of force of the parking brake and as a result smaller emergency release forces are present.

The disclosed embodiments specified above may be modified within the scope of the claims. Thus, it is conceivable, for example, that the control piston 13 is adjustable by an adjusting device. Such an adjusting device may, for example, be an electrical, electromechanical, pneumatic, hydraulic actuator.

LIST OF REFERENCE NUMERALS

1 Brake cylinder
1a Housing
1b Housing portion
1c Holding portion
2 Service brake piston
3 Piston axis
4 Direction of movement
5 Piston tube
6 Threaded portion
7 Threaded nut
8 Toothing
9 Thread
10 Locking device
11, 12 Pawl
11a, 12a Lever arm
11b, 12b Drive end
11c, 12c Lever arm
11d, 12d Pawl end
11e, 12e Pivot axis
11f, 11g Drive portion
13 Control piston
13a Control axis
13b Drive portion
13c Body
13d Output end
13e Spring
13f Control body
13g Control surface
14 Emergency release tappet
14' Emergency release actuator
14a Emergency release axis
14b, 14'b Actuating end
14c, 14'c Body
14d Output end
14e Spring
14f Actuating portion
14g Locking block
14h Guide portion
14i Step
14j Stop
15, 16 Spring holder 15a, 16a Spring
17 Locking element
17a Locking element axis
17b Body
17c Arresting portion
17d Control portion
17e Spring portion
18 Spring
19 Guide
AN Receiver space
AS Stop element
DA Pressure connection
DR Pressure chamber
GR Housing interior
KR Piston chamber
SR Control pressure chamber
ST Control pressure connection

The invention claimed is:

1. A brake cylinder comprising:
a locking device for mechanical brake force locking; and
a service brake piston which can be axially moved inside a housing by applying a pressure medium thereto; and
a piston tube coupled to the service brake piston and provided with a non-self-locking thread engaged with a threaded nut which is rotatably mounted in the housing, wherein the locking device cooperates with a toothing of the threaded nut,
wherein the locking device comprises one or more pawls, a control piston, an emergency release tappet and a locking element for the emergency release tappet,
wherein the control piston and the emergency release tappet are arranged parallel to one another and proximately adjacent to one another, and
wherein a control axis of the control piston and an emergency release axis of the emergency release tappet run parallel to one another and at right angles to a piston axis of the brake cylinder.

2. The brake cylinder of claim 1, wherein a longitudinal axis of the locking element as a locking element axis runs at right angles to the control axis of the control piston and the emergency release axis of the emergency release tappet and intersects the control axis of the control piston and the emergency release axis of the emergency release tappet.

3. The brake cylinder of claim 1, wherein the locking element is displaceably guided in the direction of its locking element axis in a locking block of the emergency release tappet and a receiver of a holding portion of a housing of the brake cylinder and is pretensioned by a spring in the direction of the control piston.

4. The brake cylinder of claim 1, wherein a control surface of a conical control body of the control piston is in contact with a control portion of the locking element.

5. The brake cylinder of claim 1, wherein the locking element is adjustable, by the contact of the locking element's control portion with the control surface of the conical control body of the control piston in a direction of the locking element's locking element axis as a function of the position of the control piston, from a first position in which the locking element axially locks the emergency release tappet into a second position in which the locking element axially unlocks the emergency release tappet, and back again.

6. The brake cylinder of claim 1, wherein the locking element has an arresting portion which in the first position of the locking element is engaged with a step of a locking block of the emergency release tappet in a locked state of the emergency release tappet and axially locks the emergency release tappet.

7. The brake cylinder of claim 1, wherein the one or more pawls are arranged radially opposing one another on the toothing of the threaded nut, relative to a piston axis to which the threaded nut is coaxially arranged.

8. The brake cylinder of claim 1, wherein the one or more pawls are able to be actuated at the same time both by the control piston and by the emergency release tappet.

9. The brake cylinder of claim 8, wherein the locking device is adjustable by the control piston and/or the emergency release tappet, from a blocking state in which by an engagement with the toothing of the threaded nut the one or more pawls block the rotation thereof about the piston axis, into a release state in which the one or more pawls are disengaged from the toothing of the threaded nut, so as to enable rotation of the threaded nut, wherein the locking device is adjustable from the release state into the blocking state by the control piston in response to, after the application of pressure, the control piston being subsequently vented again.

10. The brake cylinder of claim 1, wherein the one or more pawls of the locking device are movable independently of one another.

11. The brake cylinder of claim 1, wherein a pressure medium is able to be applied to the control piston and in that the emergency release tappet is adjustable manually and/or by the use of a tool.

* * * * *